United States Patent
Sahinoglu et al.

(10) Patent No.: US 7,801,107 B2
(45) Date of Patent: Sep. 21, 2010

(54) METHOD FOR TRANSMITTING A COMMUNICATIONS PACKET IN A WIRELESS COMMUNICATIONS NETWORK

(75) Inventors: Zafer Sahinoglu, Watertown, MA (US); Andreas F. Molisch, Arlington, MA (US); Philip V. Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1119 days.

(21) Appl. No.: 11/477,255

(22) Filed: Jun. 29, 2006

(65) Prior Publication Data

US 2007/0274261 A1 Nov. 29, 2007

Related U.S. Application Data

(63) Continuation-in-part of application No. 11/475,264, filed on Jun. 27, 2006.

(60) Provisional application No. 60/808,412, filed on May 25, 2006.

(51) Int. Cl.
*H04J 3/06* (2006.01)
(52) U.S. Cl. .................. 370/350; 370/338; 370/349
(58) Field of Classification Search ............... 370/338
See application file for complete search history.

(56) References Cited

OTHER PUBLICATIONS

IEEE Draft P802.15.4a/D2, Apr. 2006.
Molisch: "UWB for Sensor Network", Mar. 10, 2006.

*Primary Examiner*—Rafael Pérez-Gutiérrez
*Assistant Examiner*—German Viana Di Prisco
(74) *Attorney, Agent, or Firm*—Dirk Brinkman; Gene Vinokur

(57) ABSTRACT

A method and apparatus for transmitting a packet in a wireless communications network is presented. A packet is constructed to include synchronization header, a physical layer header, and a payload. A preamble and a start of frame delimiter are inserted in the synchronization header. Multiple fixed length ternary sequences are inserted in the start of frame delimiter in an arbitrary order, and then the packet is transmitted.

11 Claims, 7 Drawing Sheets

Fig. 1
Prior Art

METHOD FOR TRANSMITTING A COMMUNICATIONS PACKET IN A WIRELESS COMMUNICATIONS NETWORK

RELATED APPLICATION

This application is a Continuation-in Part Application of U.S. patent application Ser. No. 11/475,264, filed on Jun. 27, 2006 by Sahinoglu, which claims priority to U.S. Provisional Application No. 60/808,412, "Preamble Design for Improved Synchronization," filed on May 25, 2006 by Sahinoglu et al.

FIELD OF THE INVENTION

The present invention relates generally to wireless communications, and more particularly to preambles in communication packets.

BACKGROUND OF THE INVENTION

As shown in FIG. 2, a typically prior art wireless packet 200 includes of a synchronization header (SHR) 210, a physical layer header (PHR) 220, and a payload 230 of data. The SHR 210 contains a preamble 240 and start of frame delimiter (SFD) 250.

The SHR is used to achieve signal acquisition, signal synchronization and ranging. The SFD 250 is used to detect the end of the preamble 240, the end of the SHR header 210, and the start of the PHR 220. That is, the SFD 250 serves as a delimiter between the SHR and the PHR.

The Task Group for the emerging IEEE 802.15.4a standard for an alternative physical layer is standardizing the structure of the preamble 240 and the SFD 250. According to the IEEE Draft P802.15.4a/D2, April, 2006, incorporated herein by reference, the preamble 240 has a repetition of eight identical, fixed length perfectly balanced ternary sequences (PBTS) 110 of ternary symbols (Si), as shown in FIG. 1, i.e., all X are the same.

As shown in FIG. 3, the ternary symbols (Si) 110 can be a pulse with positive (+) polarity 320, a pulse with negative (−) polarity 330, or a pulse with a zero (0) multiplier 340. Each pulse is separated from the next by a pulse repetition interval (PRI) 310. The PBTS 110 in FIG. 3 have perfect periodic autocorrelation properties in a sense that side lobes around an autocorrelation peak are zero as shown in FIG. 3 for symbols S1.

FIG. 2 shows the SFD 250 specified in the IEEE Draft P802.15.4a/D2 standard. The SFD also has a periodic structure that includes a repetition of the identical base pattern X 260. The repetition of the base pattern X 260 within the SFD 250 generates periodicity. The periodicity helps to achieve statistical multiplexing gain from the repetitions.

However, the SFD should have an arbitrary, non-periodic pattern to help the receiver to determine what section of the SFD 250 is being received. Therefore, it is desired to improve the SFD by removing the periodicity without sacrificing the statistical multiplexing gain that is achieved by repetitions of the base pattern X.

SUMMARY OF THE INVENTION

A method and apparatus transmits a packet in a wireless communications network. The transmitted packet includes a synchronization header, a physical layer header, and a payload. The synchronization header includes a preamble and a start of frame delimiter. The start of frame delimiter includes an arbitrary pattern of fixed length ternary sequences.

BRIEF DESCRIPTION OF THE DRAWINGS

FIG. 1 is a prior art list of length 31 ternary symbols that have autocorrelation properties;

DETAILED DESCRIPTION OF THE PREFERRED EMBODIMENT

The embodiments of the invention provide a structure for a packet structure in a wireless communications network designed according to an emerging IEEE 802.15.4a standard as described in IEEE Draft P802.15.4a/D2, April, 2006;

IEEE Draft P802.15.4a/D2, incorporated herein by reference in its entirety.

Figure 2:
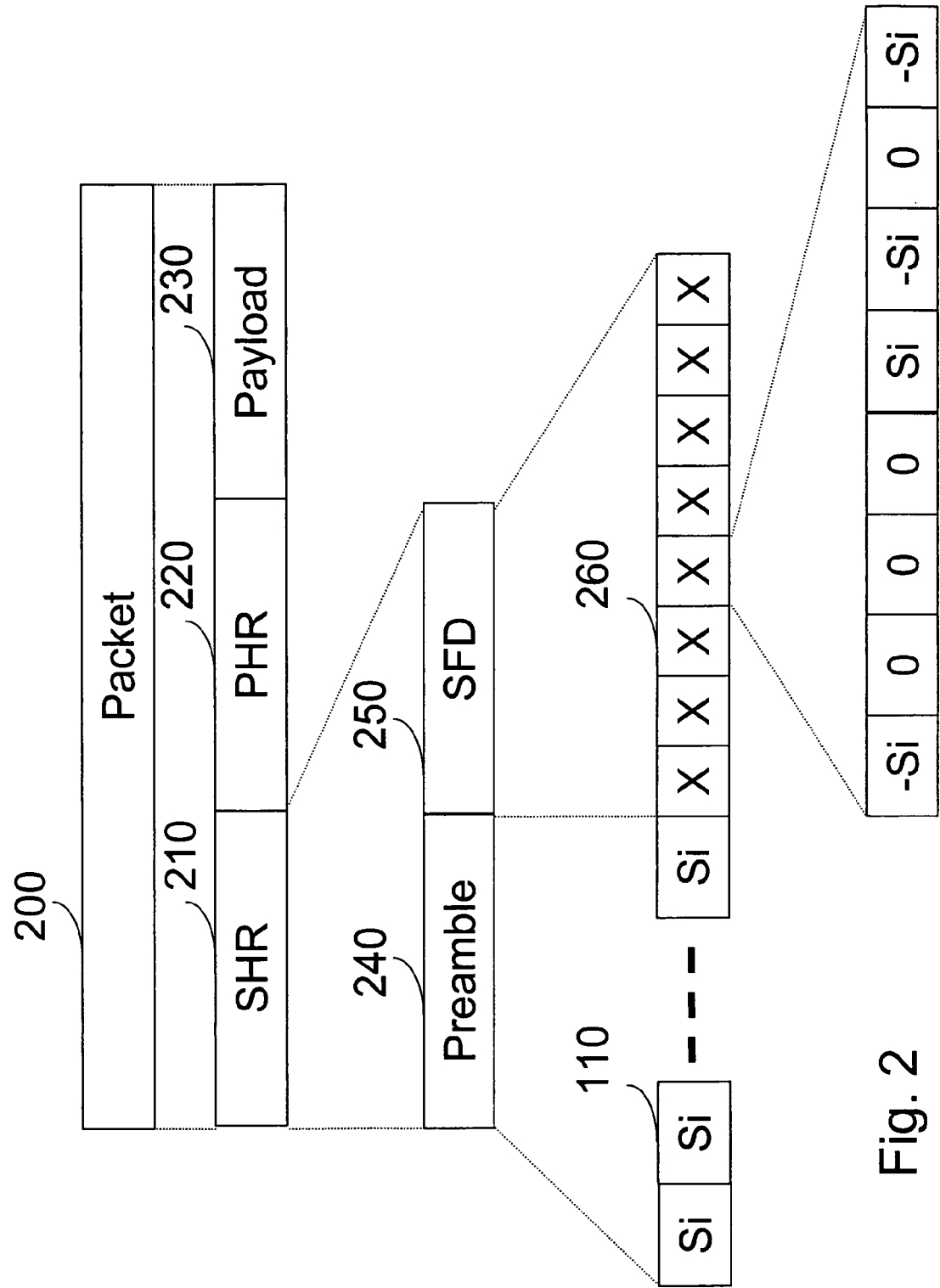
FIG. 2 is a block diagram of a prior art packet structure for a wireless network designed according to an emerging IEEE 802.15.4a standard in IEEE Draft P802.15.4a/D2, April, 2006.
Figure 3:
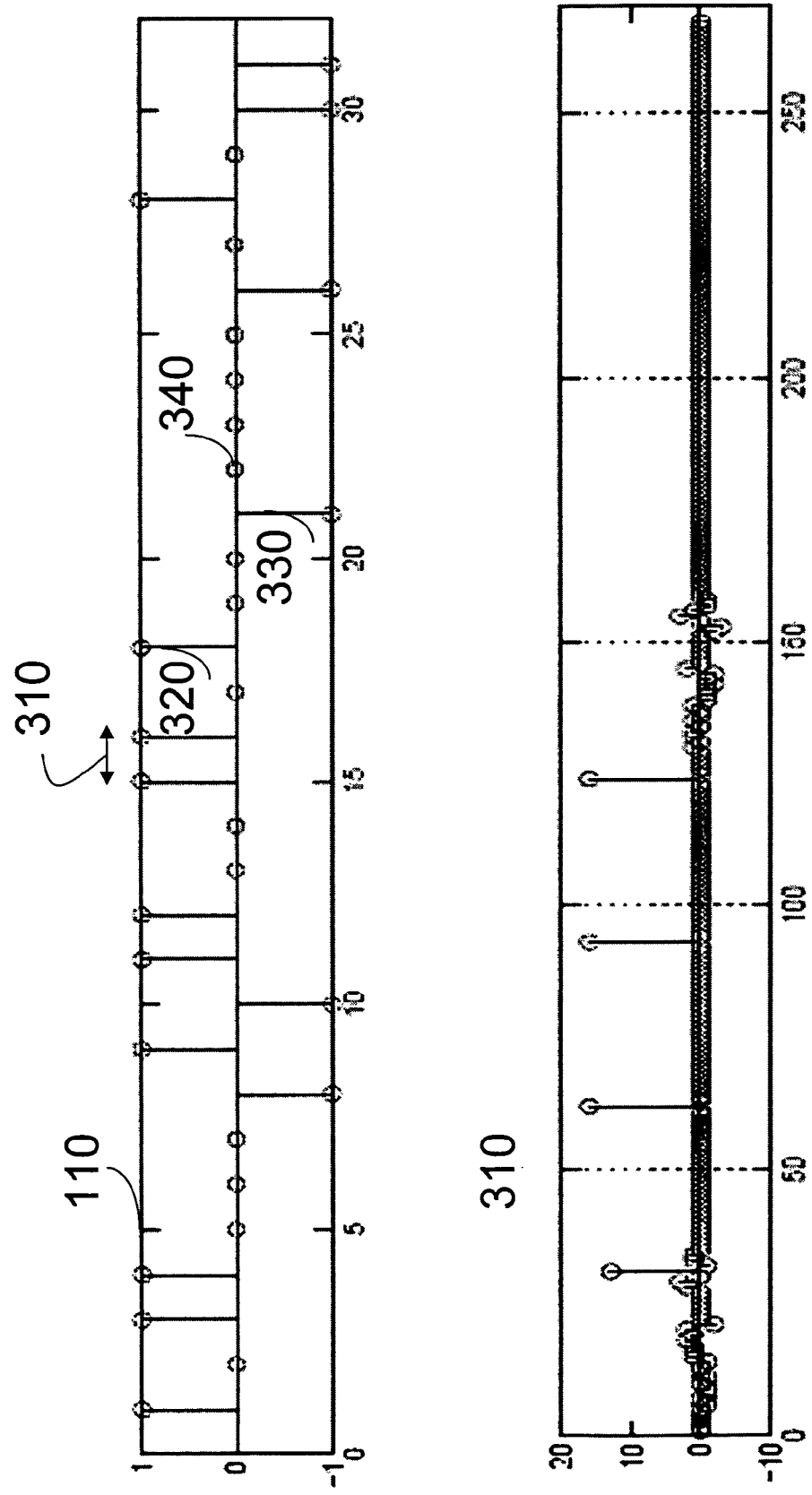
FIG. 3 is a prior art timing diagram of a length-31 ternary symbol with perfect periodic autocorrelation in time domain, and a corresponding autocorrelation function.
Figure 4:
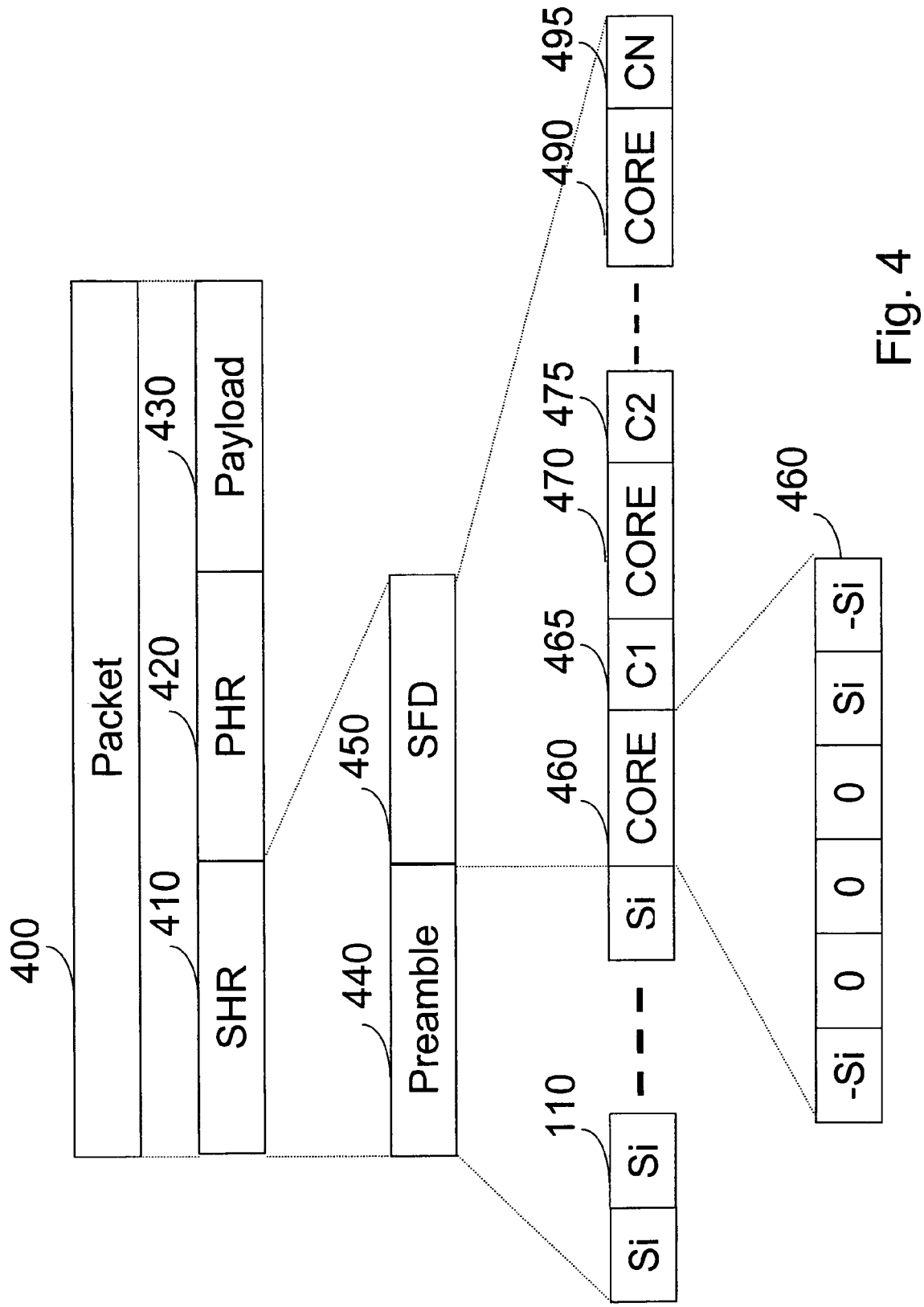
FIG. 4 is a block diagram of a packet structure according to an embodiment of the invention.

As shown in FIG. 4, a packet 400 includes a synchronization header (SHR) 410, a physical layer header (PHR) 420, and a payload 430 of data. The SHR 420 includes a preamble 440 and start of frame delimiter (SFD) 450.

Figure 1:
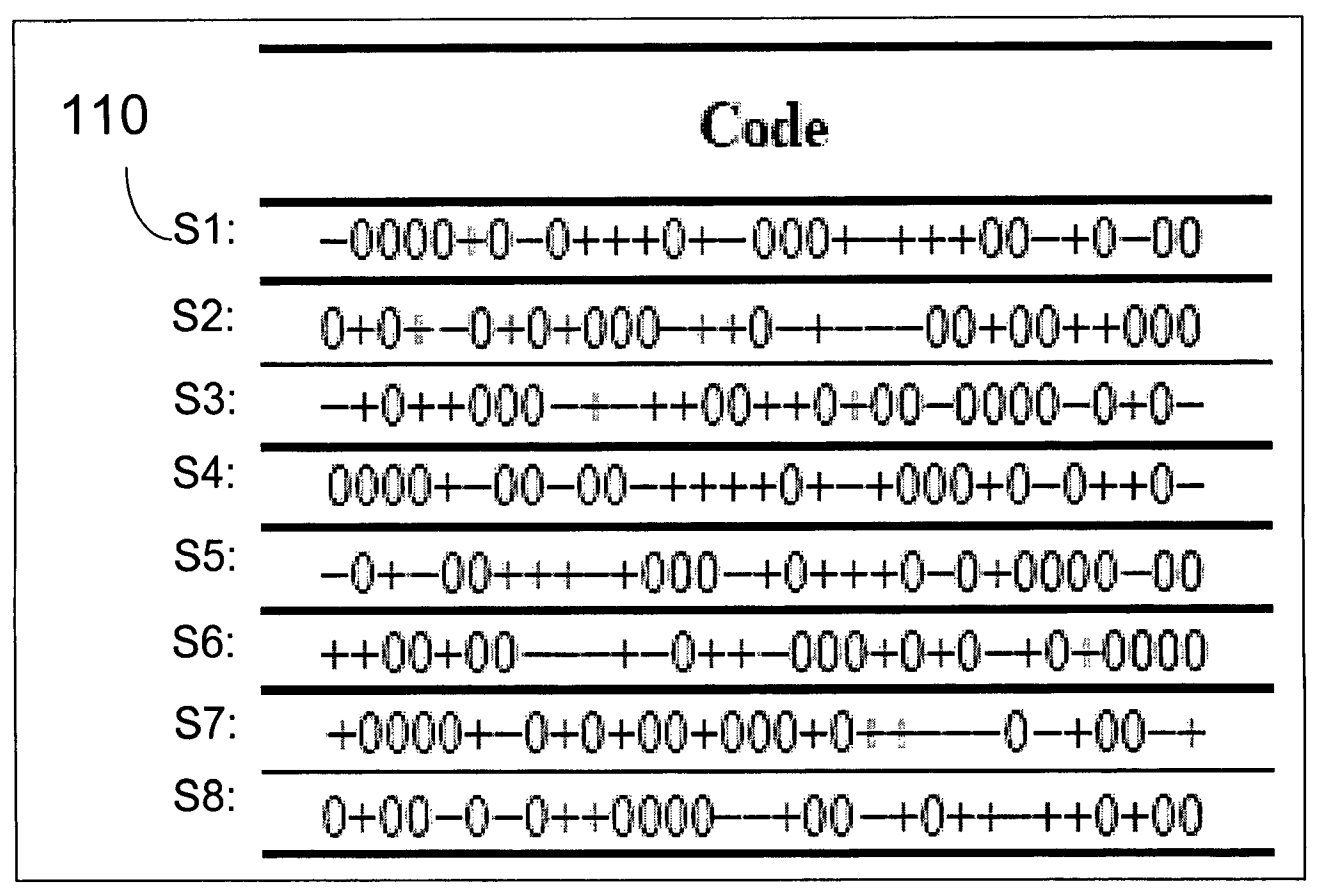

The preamble 440 includes repetitions of a selected PBTS 110 as shown in FIG. 1.

The SFD structure according to an embodiment of the invention differs from that specified in IEEE Draft P802.15.4a/D2 standard. The SFD 450 includes N repeated pairs of constant cores and varying suffixes, 460 and 465, 470 and 475, 480 and 485, . . . , 490 and 495. The suffix can also be called a counter.

If there are N repetitions of the constant core, then there are N different suffixes or counters.

One structure for the core includes ternary symbols {−Si, 0, 0, 0, Si, −Si }. If N is 4, then four different suffixes can be specified.

Figure 5:
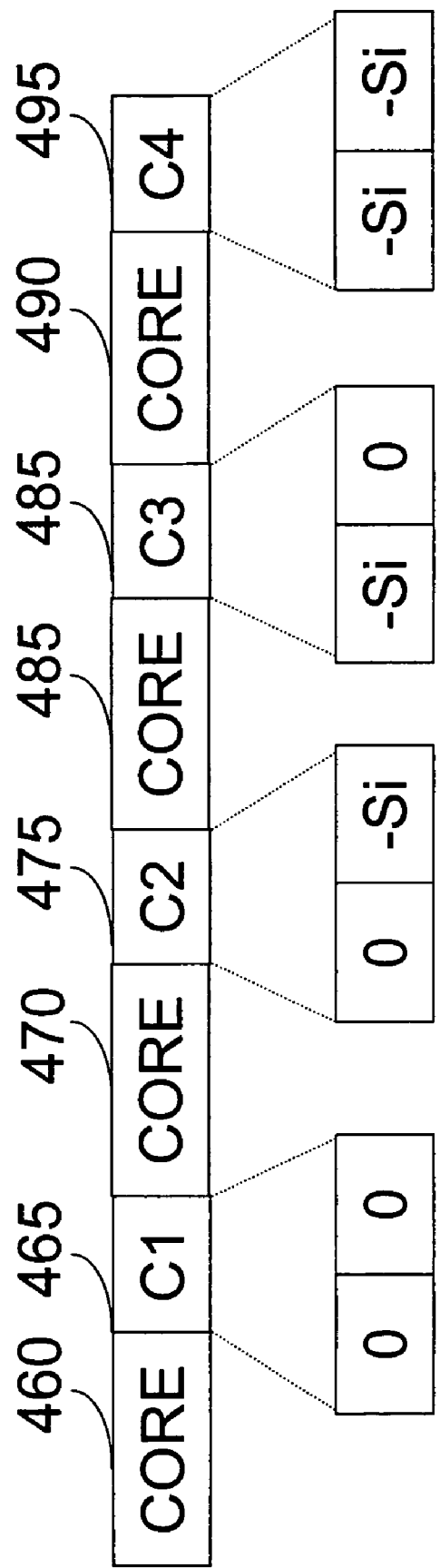
FIG. 5 is detailed block diagram of a start of frame delimiter (SFD) according to an embodiment of the invention.
Figure 6:
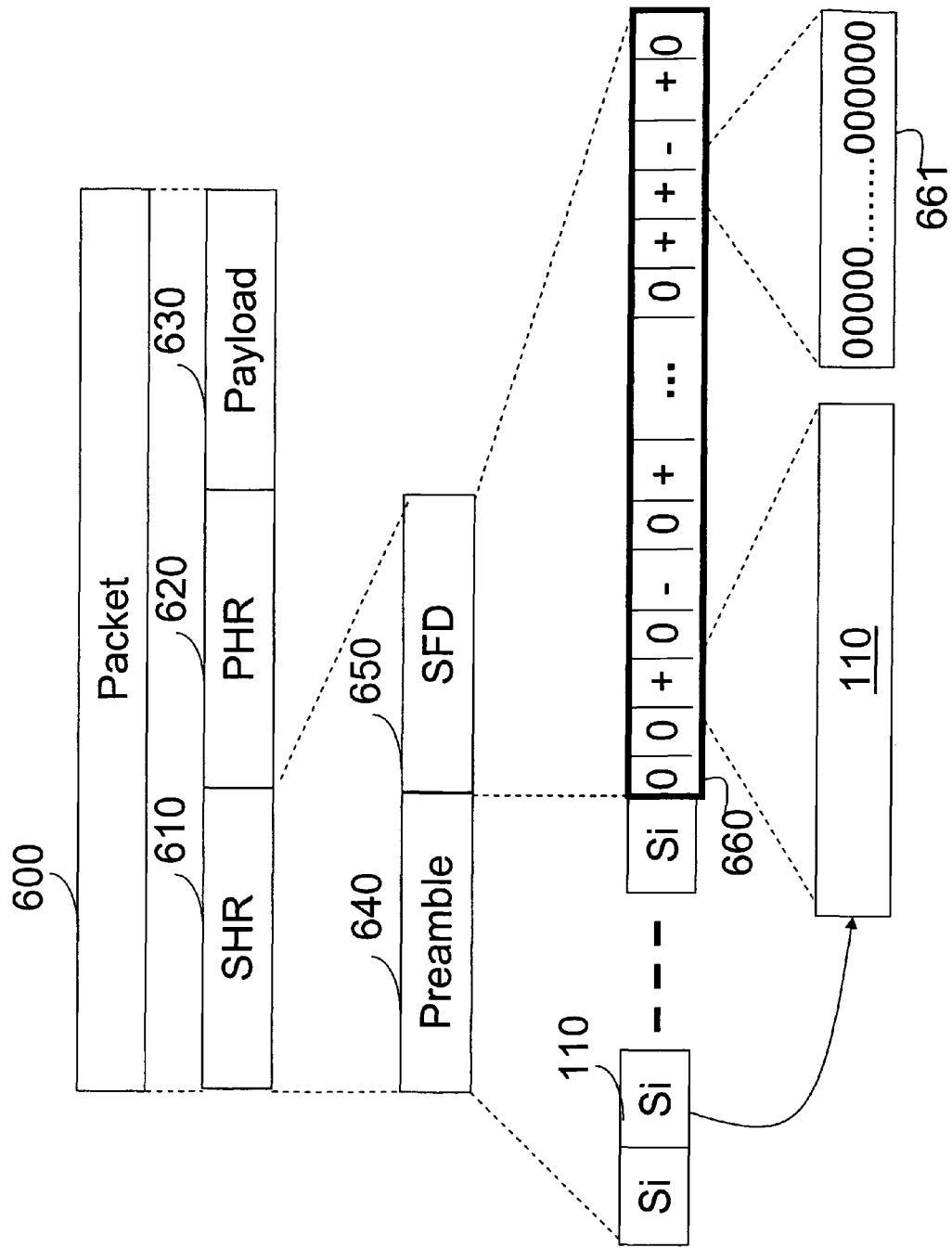
FIG. 6 is a block diagram of a SFD according to another embodiment of the invention.

As shown in FIG. 5, the first suffix can be C1={0, 0} 465, the second suffix C2={0,−Si} 475, the third suffix C3={0−Si} 485, and the fourth suffix C4={Si,−Si} 495.

If each suffix has a different pattern of ternary symbols as described above, then the receiver can determine the number of repetitions received at a given time. This makes it possible to synchronize a clock of the receiver relatively within the SFD 450 without any ambiguity.

Furthermore, the receiver can still obtain statistical multiplexing gain from the repetitions of the constant cores of the SFD 450.

Improved Autocorrelation

The problem with the counter approach as described above is that the SFD as a whole does not have a good autocorrelation function. The autocorrelation function contains high side lobes. Therefore, it improves the detection performance compared to that in IEEE Draft P802.15.4a/D2, April, 2006. However, the improvement is marginal.

This embodiment of the invention specifies a packet structure as an improvement to the packet structure described in the IEEE Draft P802.15.4a/D2, April, 2006 and also in the parent application. According to this embodiment, a packet 600 includes a synchronization header (SHR) 610, a physical layer header (PHR) 620 and payload 630.

The SHR 610 includes a preamble 640 and a start of frame delimiter (SFD) 650. The preamble 640 contains repetitions of a selected one of the perfectly balanced ternary sequences (PBTS) 110 as described above. That is, the multiple PBTS 110 in the preamble are all identical.

The structure of the SFD 650 differs from that in the IEEE Draft P802.15.4a/D2, April, 2006. The SFD according to this embodiment includes an arbitrary sequence of codes 660, e.g., 64 codes. Each code may represent a fixed length $2^n-1$ ternary sequence, e.g., length of 31, 63, or 127. If the code is 0, then the fixed length sequence 661 is all zeros. If the code is +1, then the sequence 110 is $S_i$ as in the preamble, and if the code is −1, then the sequence 110 is $-S_i$, a negation of the PBTS 110 in the preamble.

Figure 7:
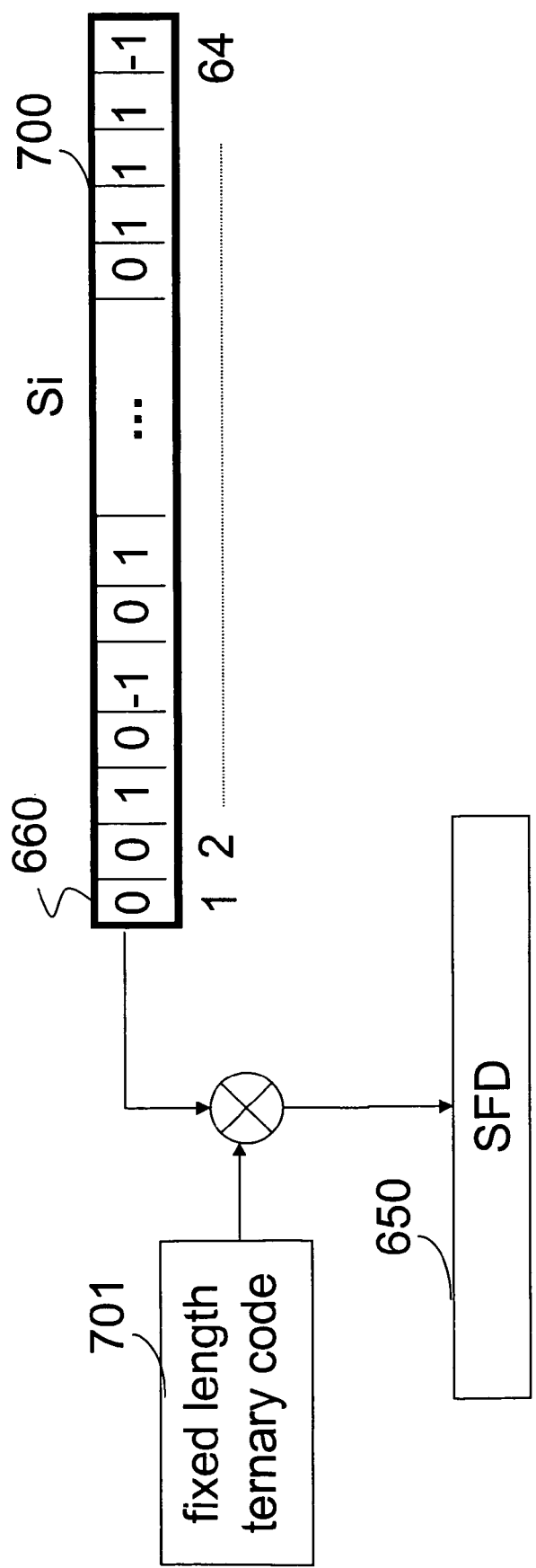
FIG. 7 is a block diagram of a Kronecker operation to construct a SFD according to an embodiment of the invention.

The construction of the SFD 650 can be described as the Kronecker product of two codes as in FIG. 7. Specifically in this embodiment, the SFD 650 is the Kronecker product of an arbitrary sequence of ternary code Su 700, e.g., 64 codes, and a selected fixed length ternary code 701, e.g., Si, −Si. If the ternary code in Su is 0, then the Kronecker product results in a sequence of all zeros. After the Kronecker operation, we have the following equation for the entire SFD sequence $$SFD = Su \otimes Si,$$

where the symbol $\otimes$ represent the Kronecker product and the overall length of the SFD 650 is $$64*31=1984.$$

In one embodiment, an order and arrangement of the first 8 codes 660 are identical to the second 8 codes, e.g., {0, 0, +1, +1, −1, 0, −1, 0, 0, 0, +1, +1, −1, 0, −1, 0}, and the order and arrangement of the remaining codes are arbitrary.

The advantage of having an SFD 650 with the arbitrary structure as defined above is that the sequence 650 has a high peak to side-lobe ratio, which leads to improved detection performance.

In one embodiment, optimal ternary codes that maximize detection performance can be any of the following arbitrary sequences:

Code-1:

[0 0 −1 1 1 0 −1 1 −1 −1 −1 0 0 1 0 0 1 1 0 0 0 0 1 0 1 −1 0 1 0 1 0 0 −1 1 1 0 0 0 0 1 −1 0 1 0 1 0 0 1 0 0 0 1 0 1 1 −1 −1 −1 0 −1 1 0 0 0];

Code-2:

[1 −1 0 1 0 1 0 0 0 0 1 0 1 0 1 1 −1 −1 −1 0 −1 1 0 0 −1 1 1 0 0 0 0 0 0 0 0 1 −1 0 0 −1 0 0 −1 1 1 1 1 1 0 1 −1 1 0 0 0 1 0 −1 0 1 1 0 −1 0 0];

Code-3:

[1 −1 0 1 0 1 0 0 1 −1 0 1 0 1 0 0 −1 −1 −1 0 −1 1 0 0 −1 1 1 0 0 0 0 0 0 0 0 1 −1 0 0 −1 0 0 −1 1 1 1 1 1 0 1 −1 0 0 0 1 0 −1 0 1 1 0 −1 0 0];

These arbitrary sequences are determined experimentally.

EFFECT OF THE INVENTION

The embodiment of the invention improves synchronization of a receiver to a received packet and improves the detection of the start of frame delimiter (SFD).

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for transmitting a packet in a wireless communications network, comprising:

constructing a packet including synchronization header, a physical layer header, and a payload;

inserting a preamble and a start of frame delimiter in the synchronization header;

inserting an arbitrary sequence of ternary codes in the start of frame delimiter, each code representing a fixed length ternary sequence, in which the ternary codes are 0, +1, or −1, and each code 0 corresponds to a sequence of zeros having the fixed length, and each code +1 represents a perfectly balanced ternary sequence of the fixed length in the preamble, and each code −1 represents a negation of the perfectly balanced ternary sequence in the preamble, and in which the arbitrary sequence of ternary codes is represented by Su, and the perfectly balanced ternary sequence is represented by Si, and the start of frame delimiter is a Kronecker product of Su$\otimes$Si; and transmitting the packet.

2. The method of claim 1, in which an order and arrangement of the first eight codes in the start of frame header are identical to the next eight codes, and the remaining codes are arbitrary.

3. The method of claim 1, in which the fixed length is $2^n-1$.

4. The method of claim 1, in which there are sixty-four arbitrary ternary codes in the start of frame delimiter.

5. The method of claim 1, further comprising:

synchronizing a clock of a receiver according the start of frame delimiter.

6. The method of claim 1, in which a receiver obtains a statistical multiplexing gain from the start of frame delimiter.

7. The method of claim 1, in which the network is designed according to an IEEE 802.15.4a standard.

8. An apparatus for transmitting a packet in a wireless communications network, comprising:

means for constructing a packet including synchronization header, a physical layer header, and a payload;

means for inserting a preamble and a start of frame delimiter in the synchronization header;

means for inserting an arbitrary sequence of ternary codes in the start of frame delimiter, each code representing a fixed length ternary sequence, in which the ternary codes are 0, +1, or −1, and each code 0 corresponds to a sequence of zeros having the fixed length, and each code +1 represents a perfectly balanced ternary sequence of the fixed length in the preamble, and each code −1 represents a negation of the perfectly balanced ternary sequence in the preamble, and in which the arbitrary sequence of ternary codes is represented by Su, and the perfectly balanced ternary sequence is represented by Si, and the start of frame delimiter is a Kronecker product of Su$\otimes$Si; and means for transmitting the packet.

9. The apparatus of claim 8, further comprising:

means for synchronizing a clock of a receiver according the start of frame delimiter.

10. The apparatus of claim 9, in which the receiver obtains a statistical multiplexing gain from the start of frame delimiter.

11. The apparatus of claim 8, in which the network is designed according to an IEEE 802.15.4a standard.

* * * * *